United States Patent
Zhang et al.

(10) Patent No.: US 6,731,794 B2
(45) Date of Patent: May 4, 2004

(54) METHOD AND APPARATUS FOR ESTIMATING TRUE COLOR VALUES FOR SATURATED COLOR VALUES IN DIGITALLY CAPTURED IMAGE DATA

(75) Inventors: Xuemei Zhang, Mountain View, CA (US); David H Brainard, Santa Barbara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 419 days.

(21) Appl. No.: 09/834,807

(22) Filed: Apr. 12, 2001

(65) Prior Publication Data

US 2002/0176621 A1 Nov. 28, 2002

(51) Int. Cl.[7] .................................................. G06K 9/00
(52) U.S. Cl. ....................... 382/165; 382/272; 382/274; 358/520
(58) Field of Search ................................ 382/162, 165, 382/167, 254, 272, 274; 358/518, 520

(56) References Cited

U.S. PATENT DOCUMENTS

| | | | | |
|---|---|---|---|---|
| 5,051,928 A | * | 9/1991 | Gruters | 345/591 |
| 5,204,948 A | * | 4/1993 | Kato | 358/520 |
| 5,241,468 A | * | 8/1993 | Kenet | 600/300 |
| 5,341,464 A | * | 8/1994 | Friedman et al. | 345/590 |
| 5,475,769 A | * | 12/1995 | Wober et al. | 382/167 |
| 5,874,988 A | | 2/1999 | Gu | 348/97 |
| 5,926,291 A | * | 7/1999 | Haraguchi et al. | 358/518 |
| 6,134,345 A | * | 10/2000 | Berman et al. | 382/162 |
| 6,160,912 A | * | 12/2000 | Usami | 382/167 |

FOREIGN PATENT DOCUMENTS

GB  2352354 A  1/2001  ............ H04N/9/64

* cited by examiner

*Primary Examiner*—Daniel Mariam

(57) ABSTRACT

A system and method of adjusting a saturated color value in a digital color image by estimating a true color value for the saturated color value using a statistical technique where a prior statistical distribution of color values representing the probability of captured responses of an image capture device is used to determine a posterior distribution of possible true color values for the saturated color values. The method is preformed by obtaining a first statistical distribution of color values associated with all pixel locations in the digital image that represents captured responses of an image capture device. A saturated color value of a first color component and its location is detected in the digital data. Based on the other color component color values at the detected location, a second statistical distribution is derived from the first distribution that represents a distribution of possible true color values for the detected saturated color value. The mean of the second distribution provides an estimation of the true color value for adjusting the detected saturated color value.

21 Claims, 4 Drawing Sheets

METHOD AND APPARATUS FOR ESTIMATING TRUE COLOR VALUES FOR SATURATED COLOR VALUES IN DIGITALLY CAPTURED IMAGE DATA

FIELD OF THE INVENTION

The present invention relates to the enhancement of digital image data captured by an image capture device and, in particular, to the adjustment of saturated color values in digitally captured image data.

BACKGROUND OF THE INVENTION

A digital image capture device, such as a digital camera, employs an array of light detector cells or sensors for detecting the intensity of light reflected/transmitted from an image. For instance, a charge-coupled device (CCD) sensor includes an array of charge-coupled devices each detecting light intensity via charge stored in each CCD at a given location (referred to as the pixel location) in the image being captured. The light information detected by the sensors is then converted into digital image data.

There are two commonly known techniques for obtaining digital color images from an image capture device. The first technique uses a single sensor array having color filters positioned in front of each sensor cell in the array. Each color filter is of a specific type and selectively transmits one of a selected group of defined ranges of wavelengths in the visible spectrum—each specified spectral transmissivity corresponds to a filter type. The color filter types are arranged in a repeating multi-color pattern (called a mosaic) in front of the array of sensor cells. As a result, the digital data obtained from this sensor design includes a single color value for each pixel location in the image, with the color information provided by the value depending on the filter type at that pixel. This type of image data is referred to as mosaiced digital data. In order to obtain usable color digital data having multiple color values for each pixel location, the mosaiced image data is demosaiced. Demosaicing is performed by interpolating the color values in the mosaiced image data to generate multiple color values for each pixel location of the image.

The second technique for obtaining digital color images uses multiple, overlaid sensor arrays—each being differentially sensitive to a particular region of the visible spectrum and each region corresponding to a particular color. For instance, a red, a green, and a blue light sensitive array can be overlaid such that each sensor cell or location in the image capture device includes a red, a green, and a blue light sensitive detector. In this way, three intensity values are detected and three color values are obtained for each pixel location in the image thereby producing non-mosaiced digital data. Another technique for obtaining non-mosaiced digital image data is performed by using multiple sensor arrays, and splitting incoming light in multiple directions In still another known technique, a single sensor is used at each pixel location and the properties of a color filter associated with the entire sensor array are rapidly varied to obtain multiple color values at each pixel location thereby providing non-mosaiced image data.

In both cases of the mosaiced and non-mosaiced image data each color value is digitally represented by a range of possible color values depending on the number of bits used in the digital representation. For example, if eight bits (i.e., one byte) are used to digitally represent a color value, its value will range from zero to 255 (i.e., $2^8-1$).

When the color value equals the maximum value of the range (e.g., 255), it is referred to as being "saturated". In other words, for an eight bit digital representation, a saturated color value is represented by "11111111". In this case, it is not possible to know whether the true color value of the captured image at that pixel location is greater than or equal to the detected saturated color value. As a result, color information may be lost at pixel locations having saturated color values thereby causing degradation of quality of the image color. For instance, if at a given pixel location one of the color values is saturated and the actual color value is higher, while the other color values at the same pixel location are not saturated, then the reproduced hue at that pixel location will be different than the actual image color. If this type of color degradation is exhibited at many pixel locations, the overall quality of the digital image can be greatly diminished.

Moreover, since saturation most often happens at highlighted areas of an image, which tend to be bright and achromatic, the resulting color errors can be very noticeable. Compounding the problem, different sensor types (for detecting different colors) may saturate at different light levels either because of differences in gain or because the scene illuminant has a strong color cast. In these situations, since the red, green, and blue sensors do not saturate at the same time, serious color errors can result.

Accordingly, there is a need for a technique and apparatus for reducing the severity of color errors caused by sensor saturation.

SUMMARY OF THE INVENTION

The present invention is a method and system thereof of adjusting a saturated color value in a digital color image representation by estimating a true color value for the saturated color value. According to the method and system thereof, a first statistical distribution of color values associated with all pixel locations in the digital image data is obtained that represents the probability of an image capture device capturing color values of an particular set of color types or, in other words, the probability of captured responses of an image capture device. A saturated color value and its corresponding pixel location is detected in the digital image data. A second statistical distribution that represents a distribution of possible true color values for the detected saturated color value is derived from the first distribution based on the other color values at the detected saturated pixel location. The mean of the second distribution provides an estimate of the true color value for adjusting the detected saturated color value.

In one embodiment, the first statistical distribution is obtained by assuming that it is a multivariate normal distribution that can be parameterized by a mean vector and a covariance matrix estimated from the pixel locations with non-saturated color values in the digital image. In an alternative embodiment, the first distribution is obtained by assuming that it is a non-normal distribution with parameters estimated from the pixel locations with non-saturated color values in the digital image.

In still another embodiment, the parameters defining the first statistical distribution are determined by measuring the spectral sensitivities of the image capture device, the assumed scene illuminant (or illuminants), and a collection of object surface reflectance. The first distribution of color values is then obtained by calculating the camera's responses to the collection of surfaces illuminated by the assumed scene illuminant (or illuminants).

BRIEF DESCRIPTION OF THE DRAWINGS

The objects, features and advantages of the present invention will be apparent to one skilled in the art, in view of the following detailed descriptions in which.

DETAILED DESCRIPTION OF THE INVENTION

In general, the system and method of the present invention applies a statistical concept referred to as Bayes Theorem to the estimation of saturated color values in digital image data. According to Bayes Theorem, prior knowledge of given variables is used to determine the probability of current variables. In the case of the system and method of estimating saturated color values, the prior knowledge corresponds to a distribution representing the probability of an image capture device capturing color values of an particular set of color types or, in other words, the probability of captured responses of an image capture device. This prior knowledge is then used to estimate the true color value of a detected saturated color value based on the other color values at the detected saturated color value pixel location.

Figure 1:
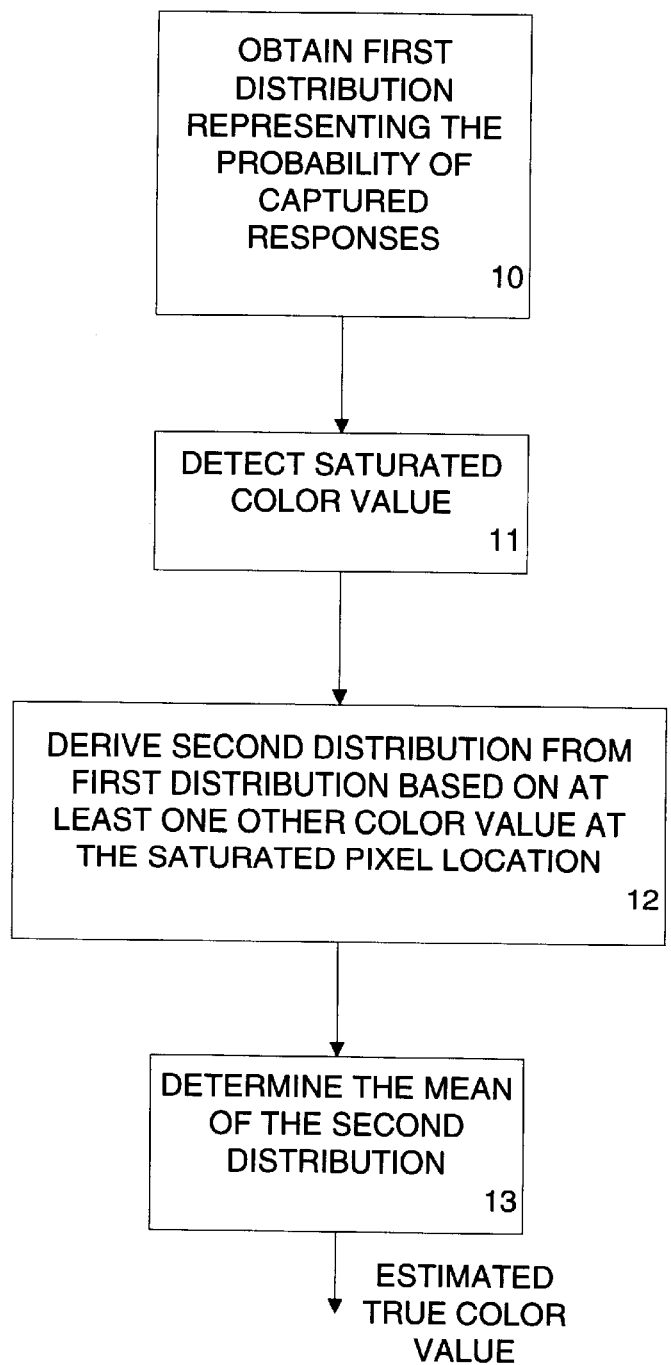
FIG. 1 illustrates a first embodiment of a method for estimating a true color value for a saturated color value in digital color image data in accordance with the present invention.

Referring to FIG. 1 a flowchart illustrates one embodiment of the method of estimating a true color value of a detected saturated color value in digital data representing a color image. It should be understood that for each pixel location in the digital data there is associated at least two color values of different color types. Initially, a first distribution associated with all pixel locations is obtained which represents the probability of captured responses of an image capture device (block 10). The first distribution, in general, is determined by the manner in which each of the different color type sensors of an image capture device responds to the light incident from an image and by the characteristics of the scene being captured. The distribution used can describe the actual capture device employed to obtain the digital data or can describe a "typical" or representative capture device. The first distribution is described by parameters and these can be determined from calculated camera responses to a set of typical object surfaces, or can be estimated from the current image data, or can be estimated from a collection of pre-selected "typical" images, as will be described herein below. The first distribution is the joint prior distribution for values of different color types. It incorporates information about the statistical relationship between the values of different color types in the images captured by an image capture device and simultaneously describes the likelihood that values of different color types will occur.

The digital image data is analyzed to detect a saturated color value and its corresponding pixel location (block 11). As indicated above, a saturated color value is one that equals the maximum possible value given the number of bits in the digital value used to represent it. One manner in which detection of saturated color values can be performed is to perform a logical function to compare each color value and each pixel location to a saturated value. If the color value is equal to the saturated color value, then the color value will be processed further according to blocks 12 and 13. This comparison, for example, can be performed using a Boolean operation.

Figure 2:
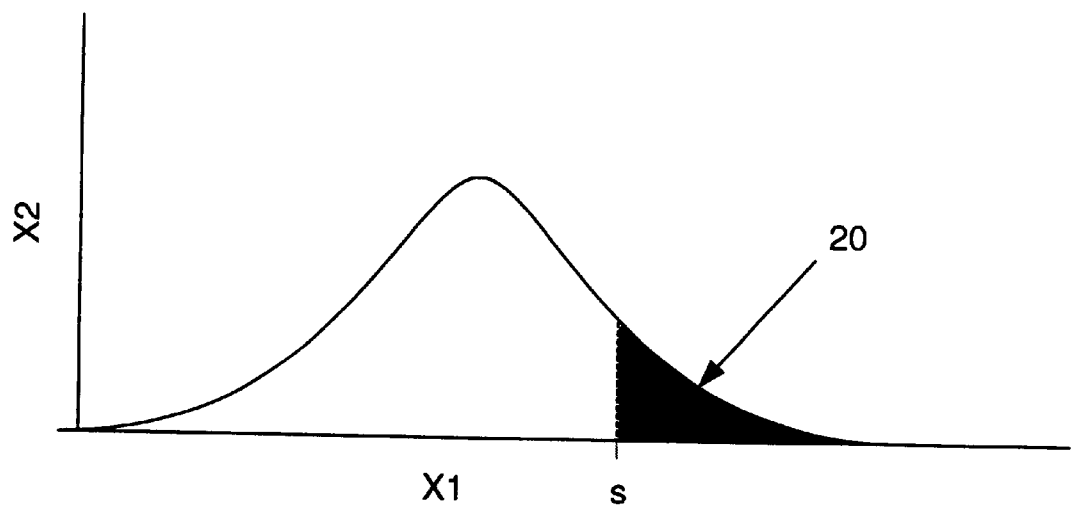
FIG. 2 shows and example of obtaining a second distribution by truncating a normal distribution at the saturation point.

A second distribution is derived from the first distribution based on, at least, one other color value of a different color type at the detected saturated pixel location (block 12). Specifically, knowledge of at least one other color value at the saturated pixel location is used to narrow down the range of possible values for the saturated value within the first distribution when the different color component responses are correlated. In particular, the second distribution is obtained from the first distribution by conditioning on the known color values at the pixel location The second distribution can be further narrowed since it is known that the saturated color value is greater than or equal to the saturation level referred to as S within the second distribution. FIG. 2 shows an example of a second distribution showing saturation level S. In the case in which the digital image is represented using eight bit color values, S will be equal to 255 (i.e., $2^8-1$). Hence, the second distribution can be truncated (i.e., the population of possible true color values can be narrowed to values in the distribution above 255) to a tighter distribution (shaded area 20). In the case in which the first distribution is assumed to be normal, the second distribution will be a truncated normal distribution. The true color value of the saturated color value is estimated by taking the mean of the truncated distribution (block 13).

As described above, the first distribution is described by parameters that can be determined through theoretical calculations or can be estimated from the actual image data. Hence, in one embodiment the first distribution is determined from the probability of captured responses calculated from a representative collection of object surface reflectance measurements, scene illuminant (or illuminants), and camera sensitivities. In another embodiment, the first distribution is estimated by analyzing a large collection of "typical" images to generate an estimated first distribution of the probability of captured responses of the "typical" images. In another embodiment, the first distribution is estimated from the current image data. In all the listed embodiments, the first distribution can be assumed to be a multivariate normal distribution or can be assumed to be some other non-normal distribution.

It should be noted that the method shown in FIG. 1 is performed by deriving the second distribution from the first distribution based on, at least, one other value of a different color type at the saturated pixel location. In an alternative embodiment, the other value is a non-saturated color value of a different color type at the saturated pixel location.

Since the first distribution applies to all pixel locations in the digital image, then block 10 is performed once to generate a single first distribution after which blocks 11–13 are reiteratively performed on a pixel-by-pixel basis until an estimated true color value is determined for all saturated color values in the image data. Alternatively, the method may be applied only to areas of identified pixel saturation in the digital image such that blocks 11–13 are performed on a sub-set of the digital image data.

Figure 3:
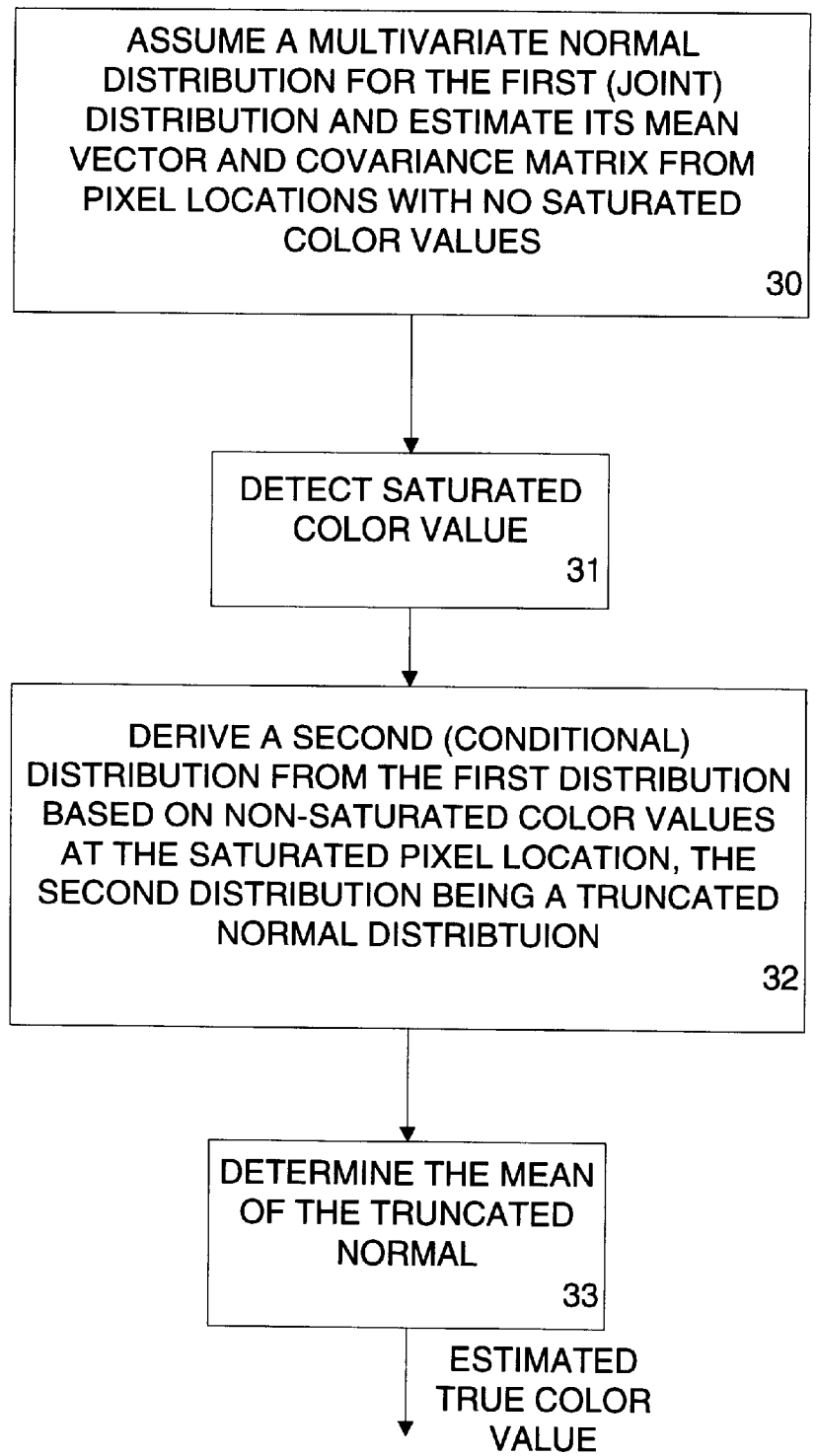
FIG. 3 illustrates a second embodiment of a method for estimating a true color value for a saturated color value in digital color image data in accordance with the present invention.

FIG. 3 shows a second embodiment of a method of estimating the true color value of a saturated color value in a digital image representation. In this embodiment, a linear capture system is assumed. It is further assumed that the first distribution representing the probability of captured responses is a multivariate normal distribution that is parameterized by a mean vector $\mu$ and a covariance matrix $\Sigma$ (block 30). For example, in the case in which three different color type sensor responses are obtained for each pixel location, it will be digitally represented by three color values ($X_1, X_2, X_3$) and the first distribution can be described by a three element mean vector $\mu = (\bar{x}_1, \bar{x}_2, \bar{x}_3)$ and a 3×3 covariance matrix (Eq. 1):

$$\Sigma = \begin{bmatrix} C_{11} & C_{12} & C_{13} \\ C_{21} & C_{22} & C_{23} \\ C_{31} & C_{32} & C_{33} \end{bmatrix} \qquad \text{Eq. 1}$$

For brevity, a matrix will be identified herein after using a linear notation such that the above covariance matrix is identified using the following notation: [C11 C12 C13; C21 C22 C23; C31 C32 C33]. Referring to the covariance matrix, Cij (i,j=1,2,3, i≠j) represents the covariance between the random variables $X_i$ and $X_j$, and Cii (i=1,2,3) represents the variance of random variable $X_1$. Each element in the mean vector, $\bar{x}_i$ (where i=1,2,3), represents the expected value (mean) of the random variable $X_i$.

Referring back to FIG. 3, a saturated color value $X_1$ and its pixel location within the image data is detected (block 31). The second distribution is derived from the first distribution based on, at least one, non-saturated color value at the detected saturated pixel location (block 32). Using the above example, the non-saturated color values at the detected saturated pixel location correspond to $X_2$ and $X_3$. The second distribution is expressed by a conditional mean $\mu_1'$ of $X_1$ and a conditional covariance matrix $\Sigma_1'$ of $X_1$ (Eqs. 2 and 3 below):

$$\mu_1' = \mu_1 + \Sigma_{1a}\Sigma_{aa}^{-1}(x_a - \mu_a) \qquad \text{Eq. 2}$$

$$\Sigma_1' = \Sigma_{11} - \Sigma_{1a}\Sigma_{aa}^{-1}\Sigma_{1a}^T \qquad \text{Eq. 3}$$

for: a=(2,3)
where:
- $\mu_1'$ is the conditional mean of the second distribution of color type $X_1$;
- $\Sigma_{1a}$ is the vector ($C_{12}, C_{13}$), where $C_{ij}$ represents the covariance between color types $X_i$ and $X_j$ (in this case, covariance between color values $X_1$ and $X_2$ and between $X_1$ and $X_3$);
- $x_a$ is a vector containing color values of color types $X_2$ and $X_3$ of the pixel location being processed;
- $\mu_a$ is the mean vector of the distribution of color types $X_2$ and $X_3$;
- $\Sigma_1'$ is the variance of the conditional distribution of $X_1$;
- $\Sigma_{11}$ is the variance of $X_1$ under the joint distribution of $X_1$, $X_2$, and $X_3$; It is the term $C_{11}$ found in the covariance matrix (Equation 1);
- $\Sigma_{aa}$ is the matrix [$C_{22}, C_{23}; C_{32}, C_{33}$]; It is the covariance matrix for color types $X_2$ and $X_3$ under the joint distribution of $X_1$, $X_2$, and $X_3$.

It can be shown that the second distribution's variance $\Sigma_1'$ is always smaller than the original variance $\Sigma_{11}$ from the first distribution of $X_1, X_2, X_3$, if $X_1$ is not independent of color values $X_2$ and $X_3$ of the non-saturated pixel locations. Thus, knowledge of $X_2$ and $X_3$ is used to narrow the range of possible true color values for the saturated color value $X_1$ if these color values are correlated, as is often the case with digital camera sensors.

In addition to knowledge of the other sensors color values $X_2$ and $X_3$, it is known that the saturated color value $X_1$ is greater than or equal to the saturation level referred to as S (FIG. 2). Hence, given this knowledge, the second distribution is truncated at the point S to further narrow the range of true color values of $X_1$. The resulting distribution is a truncated normal distribution, which can be mathematically expressed as shown in Eqs. 4 and 5 below:

$$f_{X_1'} = \frac{1}{\sqrt{(2\pi)\Sigma_1'}\, Z} e^{\frac{(x-\mu_1')^2}{2\Sigma_1'}}, \; x \geq S \qquad \text{Eq. 4}$$

$$Z = \frac{1}{\sqrt{(2\pi)\Sigma_1'}} \int_S^\infty e^{\frac{(x-\mu_1')^2}{2\Sigma_1'}} dx \qquad \text{Eq. 5}$$

where:
- $f_{x_1'}(x)$ is the probability density of the conditional distribution of $X_1$ at the point $X_1=x$; and
- $f_{x_1'}(x)=0$, for x<S.

The term Z is a normalizing term to insure that the truncated distribution expressed according to Eqs. 4 and 5 integrate to 1. Mathematically, the term Z is one minus the standard normal cumulative distribution at the point $$\frac{s-\mu_1'}{\sqrt{\Sigma_1'}}.$$

The estimated true color value for the saturated color value is obtained by determining the mean of the truncated normal of the second distribution (block 33). Assuming a squared error loss function, which minimizes the estimation error measured by mean squared difference between the estimated true color value and the true color value, a Bayes estimate $\hat{X}_1$ of the true color value of $X_1$ is determined by the following mathematical expression (Eq. 6):

$$\hat{X}_1 = \frac{1}{Z}\sqrt{\frac{\Sigma_1'}{2\pi}} e^{\frac{(S-\mu_1')^2}{2\Sigma_1'}} + \mu_1' \qquad \text{Eq. 6}$$

where, $\hat{X}_1$ is the estimated true color value.

It should be understood that in the above example, the detected saturated pixel location included the saturated color value $X_1$ and two non-saturated color values $X_2$ and $X_3$ which are used to determine the second distribution. At different saturated pixel locations, different color types (e.g. red, green, or blue) may be saturated, and the formulation presented above can still be applied, with $X_1$ representing the saturated color type and $X_2$ and $X_3$ representing the rest of the 2 color types. The above method can also apply to the case in which more than one color value is saturated at a given detected pixel location. In this case, the method shown in FIG. 3 is performed except that instead of deriving the second distribution (block 32) using non-saturated color values at the detected pixel location, the second distribution is derived using the remaining non-saturated and saturated color values at the pixel location and assuming the saturated color values are valid. For instance, if at a given pixel location, there are two saturated color values $X_{S1}$, and $X_{S2}$ and one non-saturated color value $X_{NS3}$, then a true color value is estimated for the saturated color value $X_{S1}$ by performing block 32 using $X_{S2}$ and $X_{NS3}$. Once, a true color value is determined/estimated for the first saturated color value, $X_{S1}$, an estimation for the next saturated color value, $X_{S2}$ at the same location can be determined by using the new estimated true color value for $X_{S1}$, and the non-saturated color value, $X_{NS3}$.

Hence, when more than one color value is saturated, the saturated color values are estimated one-by-one each time assuming the other color values are valid.

The sequence in which the saturated color values at a detected saturated pixel location are estimated may affect the quality of the final color at the pixel location. Consequently, the order of processing of multiple saturated color values at a given pixel location can be determined empirically so as to provide the best visual results. Consequently, in a variation of the above embodiment, the color type with the largest number of saturated pixel locations is processed first, followed by the color type with thee next largest number of saturated pixel locations, until the color type with the least number of pixel locations is processed last.

In another embodiment in which mosaic digital data is obtain from the imaging device, the image data is demosaiced prior to performing the methods as shown in FIGS. 1 and 3 to obtain a digital image representation in which each pixel location is represented by at least two color values.

Since the first distribution applies to all pixel locations in the digital image, then block 30 is performed once to generate a single first distribution after which blocks 31–33 are reiteratively performed on a pixel-by-pixel basis until an estimated true color value is determined for all saturated color values in the image data. Alternatively, the method may be applied only to areas of identified pixel saturation in the digital image such that blocks 31–33 are performed on a sub-set of the digital image data.

Figure 4:
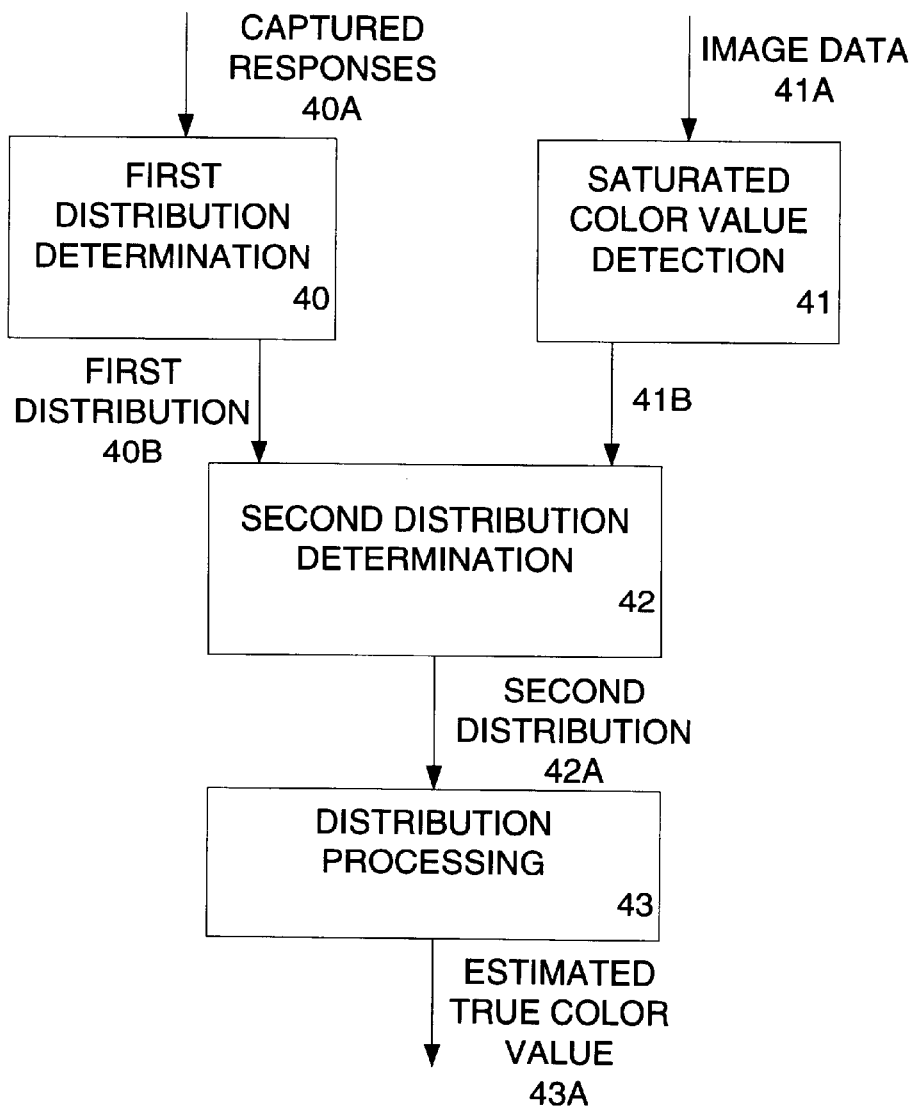
FIG. 4 illustrates an embodiment of a system for estimating a true color value for a saturated color value in digital color image data in accordance with the present invention.

FIG. 4 shows an embodiment of a system of estimating the true color value of a saturated color value in a digital image representation which includes a first distribution determination block 40, a saturated color value detection block 41, a second distribution determination block 42, and a second distribution processing block 43 for determining the mean of the second distribution.

As shown, in response to captured responses 40A, the first distribution determination block 40 generates a first distribution 40B. In one embodiment, captured responses input to 40A are determined from the camera spectral sensitivities, typical scene illuminants, and a representative collection of object surface reflectance measurements. In this embodiment, the captured responses are determined by camera simulation and the first determination block functions to determine the first distribution through statistical analysis of the simulated captured responses. Alternatively, captured responses 40A can include the non-saturated pixel location color values from digital image data 41A. In this case, the first distribution is estimated from the image data 41A. In both cases, the first distribution can be assumed to be a joint normal distribution represented by a mean vector and covariance matrix and the first distribution determination block functions to calculate the mean vector and covariance matrix from the simulated captured responses or the non-saturated pixel location color values. Still alternatively, the captured responses 40A can be a large collection of captured responses of "typical" images and the first distribution determination block functions to determine the first distribution through statistical analysis of the large collection of responses.

The system further includes a saturated color value detection block 41 having its input coupled to the color image data 41A. As described above, saturated color value detection can be performed by comparing a stored saturated color value to each color value in the digital image. If a match occurs, then a saturated color value is detected. The saturated color value, along with the other color values at the detected saturated pixel location, are coupled to the second distribution determination block 42 via connection 41B. Also coupled to block 42 is the first distribution 40B.

The second distribution determination block 42 derives the second distribution from the first distribution based on the other color values at the saturated pixel location provided in the color value information 41B. In particular, block 42 generates a narrowed distribution of possible true color values of the detected saturated color value from the first distribution dependent on the other color values at the detected saturated pixel location. This distribution is further narrowed by truncation at the saturation point S. This is the final second distribution. In the case in which the first distribution is assumed to be a joint normal distribution, the second distribution is a truncated normal distribution. Block 42 generates a second distribution 42A that is coupled to the distribution processing block 43.

The distribution processing block 43 calculates the mean of the second distribution. In the case the second distribution is a truncated normal, the mean is calculated according to equation 6. The mean corresponds to the estimated true color value 43A of the detected saturated color value.

It should be noted that the estimated true color value generated by block 43 is digitally represented by more (typically one) bits than the number of bits used to represent the original saturated color value so as to allow the true color value to exceed the saturation level value. For instance, if the saturated color value is 255 and is represented by an eight bit digital color value then the estimated true color value will be represented by a color value having more than eight bits.

Since the first distribution applies to all pixel locations in the digital image, then block 40 generates a single first distribution after which the color values in the image data 40A are reiteratively processed through blocks 41–43 on a pixel-by-pixel basis until an estimated true color value is determined for all saturated color values in the image data 40.

In one embodiment, blocks 40–43 are implemented in a computing system including at least a central processing unit (CPU) and a memory for storing digital data (e.g., image data). It should be further understood that blocks 40–43 can be implemented in software, hardware, or any combination of software and hardware.

Hence, a system and method of estimating a true color value of a saturated color value in a digital representation of a color image is described. In the preceding discription, numerous specific details are set forth in order to provide a thorough understanding of the present invention. It will be apparent, however, to one skilled in the art that these specific details need not be employed to practice the present invention. In other instances, well-known systems, processes and techniques have not been described in detail in order to avoid unnecessarily obscuring the present invention.

In addition, although elements of the present invention have been described in conjunction with certain embodiments, it is appreciated that the invention can be implement in a variety of other ways. Consequently, it is to be understood that the particular embodiments shown and described by way of illustration is in no way intended to be considered limiting. Reference to the details of these embodiments is not intended to limit the scope of the claims which themselves recited only those features regarded as essential to the invention.

We claim:

1. A method of estimating a true color value for a saturated color value in digital color image data, the method comprising:
   obtaining a first distribution associated with all pixel locations in the image data that represents a probability of captured responses of an image capture device;
   detecting a saturated color value of a first color component and its location and the image data and for each detected value:
      deriving a second distribution representing possible true color values of the detected value from the first distribution based on at least one other color component color value at the detected location; and
      determining the mean of the second distribution to obtain the estimation of the true color value.

2. The method as described in claim 1 wherein obtaining the first distribution comprises assuming that the first distribution is a multivariate normal distribution.

3. The method as described in claim 2 further comprising parameterizing the multivariate normal distribution by a mean vector and covariance matrix of non-saturated color values of all pixel locations in the image data.

4. The method as described in claim 1 wherein obtaining the first distribution comprises assuming that the first distribution is a non-normal distribution.

5. The method as described in claim 1 wherein obtaining the first distribution comprises theoretically determining the first distribution by obtaining a distribution of color values from a collection of object surface reflectance measurements, scene illuminants, and camera sensor spectral sensitivities.

6. The method as described in claim 1 wherein obtaining the first distribution comprises estimating the first distribution by analyzing a large collection of predetermined images to generate an estimated first distribution of the predetermined images.

7. The method as described in claim 1 wherein obtaining the first distribution comprises estimating the first distribution from the digital color image data.

8. The method as described in claim 1 wherein the image data is demosaiced digital data.

9. The method as described in claim 1 wherein the image capture device corresponds to the actual device used to obtain the image data.

10. The method as described in claim 1 wherein the step of deriving a second distribution further comprises deriving a second distribution from the first distribution based on at least one other color component color value of a different type at the detected location.

11. A system of estimating a true color value for a saturated color value in digital color image data comprising:
   a means for determining a first distribution associated with all pixel locations in the image data that represents a probability of captured responses of an image capture device;
   a means for detecting a saturated color value in the image data and its location;
   a means for deriving a second distribution representing possible true color values of the detected value from the first distribution based on at least one color value at the saturated pixel locations;
   a means for processing the second distribution to obtain the estimated true color value by determining a mean of the second distribution.

12. The system as described in claim 11 wherein the captured responses used to determine the first distribution are spectral sensitivities, scene illuminants, and a representative collection of object surface reflectance measurements.

13. The system as described in claim 11 wherein the captured responses used to determine the first distribution are the non-saturated pixel location color values on the image data.

14. The system as described in claim 11 wherein the captured responses used to determine the first distribution are color values of digital image data from a collection of representative images.

15. The system as described in claim 11 wherein the first distribution is assumed to be a multivariate normal distribution which is characterized by a mean vector and a covariance matrix which are estimated using the non-saturated pixel location color values of the digital image.

16. The system as described in claim 11 wherein the at least one color value is non-saturated.

17. The system as described in claim 11 wherein the at least one color value is saturated.

18. The system as described in claim 11 wherein the first distribution is assumed to be a non-normal distribution.

19. The system as described in claim 11 wherein the determination means, the detection means, the derivation means and the processing means are implemented by software, hardware, or any combination of software and hardware.

20. The system as described in claim 11 wherein the determination means, the detection means, the derivation means and the processing means are implemented within a computing system having at least a central processing unit (CPU) and a memory and storage area for storing digital data.

21. The system as described in claim 11 wherein the at least one color value comprises a different type of color value.

* * * * *